US006631164B1

US 6,631,164 B1

(12) United States Patent
Sorin et al.

(10) Patent No.: US 6,631,164 B1
(45) Date of Patent: Oct. 7, 2003

(54) ADDRESSING PROCESS FOR THE STORAGE OF IMAGE BLOCKS

(75) Inventors: Alain Sorin, Cesson-Sévigné (FR); Frédéric Plissonneau, Thorigné-Fouillard (FR); Jean-Marc Allard, Gières (FR)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/469,117

(22) Filed: Dec. 21, 1999

(30) Foreign Application Priority Data

Dec. 22, 1998 (FR) .............................. 98 16221

(51) Int. Cl.[7] .............................................. G06E 12/02
(52) U.S. Cl. .................. 375/240.26; 345/543; 345/547; 345/544; 345/555
(58) Field of Search .......................... 375/240, 240.26, 375/240.2; 345/540, 543, 547, 544, 555; 382/305

(56) References Cited

U.S. PATENT DOCUMENTS

| 5,675,387 A | | 10/1997 | Hoogenboom et al. | ..... 348/416 |
|---|---|---|---|---|
| 5,774,206 A | * | 6/1998 | Wasserman | ................ 395/200 |
| 5,815,209 A | | 9/1998 | Kondon et al. | ............ 348/403 |
| 5,872,577 A | * | 2/1999 | Perrin | ........................ 345/521 |
| 5,883,679 A | * | 3/1999 | Iskarous et al. | ........... 348/699 |
| 5,912,676 A | * | 6/1999 | Malladi et al. | ............. 345/521 |
| 6,088,047 A | * | 7/2000 | Bose et al. | ................. 345/517 |
| 6,104,416 A | * | 8/2000 | McGuinness | ............... 345/516 |
| 6,212,231 B1 | * | 4/2001 | Takano | ....................... 375/240 |

FOREIGN PATENT DOCUMENTS

| DE | 4441295 A1 | 5/1996 | ............ H04N/1/20 |
|---|---|---|---|
| EP | 849 953 A2 | 6/1998 | ............ H04N/7/50 |

OTHER PUBLICATIONS

Winzker M., et al., *Architecture and Memory Requirements for Stand–Alone and Hierarchical MPEG2 HDTV–Decoders with Synchronous Drams*, Apr. 30, 1995, vol. 1, pp. 609–612.

* cited by examiner

*Primary Examiner*—Chris Kelley
*Assistant Examiner*—Charles Parsons
(74) *Attorney, Agent, or Firm*—Joseph S. Tripoli; Ronald H. Kurdyla; Joel M. Fogelson

(57) ABSTRACT

The process for storing, in pages of a memory, image blocks (h, v) consisting of v lines of h pixels, for the reading of image blocks (H, V) consisting of V lines of H pixels, is characterized in that the horizontal shift $D_{I,\,I+a}$, in terms of number of blocks (h, v), of the boundary of a page corresponding to any row I of the image with respect to the boundary of a page corresponding to a row I+a is equal to:

$D_{I,\,I+a} = a\,D$, $\forall$ positive integer $a$ less than $R_M = \text{INT}\,[(V-2)/v]+2$, (INT corresponding to the integer part of the division)

the value D, which corresponds to the shift between two successive rows being chosen such that:

$D \geq (B_M - 1)$, with $B_M = \text{INT}\,[(H-2)/h]+2$.

Applications relate, for example to motion estimation and motion compression.

7 Claims, 3 Drawing Sheets

ADDRESSING PROCESS FOR THE STORAGE OF IMAGE BLOCKS

FIELD OF THE INVENTION

The invention relates to an addressing process for the storage of data in memories of SDRAM type.

BACKGROUND OF THE INVENTION

Digital video processing typically requires that video images be stored in memory. Two types of memories are commonly used for storing video images:

Static Random Access Memories (SRAMs). The areas of these memories are directly accessible from the address bus.

Dynamic Random Access Memories (DRAMs), or, if they are synchronous, Synchronous Dynamic Random Access Memories (SDRAMs).

Dynamic memory is split into pages and access to a new page (corresponding to a change of page) requires an access time referred to as a "time penalty". A memory address is composed of a first part referred to as the page address or "row address" and of a second part referred to as the binary address or "column address". The terms in quotation signs mentioned here are the terms commonly used in technical sheets for DRAM or SDRAM type components.

Video processing applications, which are becoming increasingly common, need to access Image blocks, that are composed of a set of pixels from an image.

Such is the case, for example, for digital video data compression according to the MPEG standard, the acronym standing for Motion Picture Expert Group, where the elementary coding size of video data is an image block constituting a macroblock. During motion estimation, a step of the digital video compression process, a current image macroblock is compared with macroblocks of a reconstructed image that are stored in an SDRAM type memory to determine which reconstructed macroblock allows for the best correlation with the current image macroblock.

In the MPEG standard, the macroblocks are sets of data consisting of four blocks of 8×8 luminance data elements and, for the 4:2:0 compression format, a macroblock is represented as two blocks of 8×8 chrominance data elements, emanating from a section of 16×16 elements from the luminance component of the image.

Typically, motion estimation calculations are performed on the luminance values alone. The relevant blocks are then just the luminance blocks of overall size 16×16. These blocks are stored in the form of blocks of 16 pixels×8 lines, the luminance blocks of overall size 16×16 being previously separated into two blocks of 16 pixels×8 lines. These new blocks correspond to a first block of the upper frame and a second block of the lower frame in image mode grouping together two frames or to a first block grouping together the first 8 lines and a second block grouping together the next 8 lines of the same frame in frame mode. These luminance blocks of 16 pixels×8 lines are called, hereinafter, luminance semi-macroblocks or simply semi-macroblocks as to indicate that the grouping together of 2 luminance blocks of 8 pixels×8 lines, the term luminance macroblock being used to denote, in the MPEG standard, the 4 luminance blocks.

It is generally necessary to retrieve, from the memory, image blocks of a size greater than blocks of 16 pixels×8 lines. The size of the retrieved blocks is typically defined by the application using such blocks.

For example, the calculation of the motion vectors is carried out with a resolution of half a pixel requiring the processing of image blocks having an additional line and a column, that is to say of dimension 17 pixels×9 lines.

Another example relates to the search windows in a reconstructed image, in which the correlation of the blocks is performed having bigger or smaller dimensions depending on the process used for motion estimation. For a process designating, in a first step, a use of a search window on the basis of a motion vector, it is generally necessary, in a second step, to refine the search to perform a local adjustment, such a refinement being carried out on a window of small dimension. In one example, these search windows have a dimension of 24×12, corresponding to a horizontal excursion of ±4 and a vertical excursion of ±2 for blocks of 16×8 pixels.

The access time to an entire block of larger size is not generally optimized, requiring access to several pages of the SDRAM memory as to read or write the values of pixels constituting this block.

FIG. 1 represents luminance macroblocks of size 16×16, a first 16×16 luminance macroblock 1 and a last 16×16 luminance macroblock 2 of one and the same horizontal row, that is to say of a horizontal succession of macroblocks over an image width. In the general case, a row of macroblocks corresponds to a slice, as defined in the MPEG standard. Hereinafter, the term row will be particularly used to define a succession of blocks or of semi-macroblocks over an image width, the term slice being reserved for the macroblocks.

Indicated on the abscissa axis are the pixel numbers and indicated on the ordinate axis are the line numbers. 16 video lines over an image width of 720 pixels correspond to 45 macroblocks of 16 pixels (720:16).

The semi-macroblocks are stored one after another according to a television type scanning, as indicated hereinafter.

FIG. 2 represents memory pages 4, 5, 6, 8 such as they are successively addressed during the storage of the semi-macroblocks. As indicated previously, the 16×16 macroblocks are stored into two parts, the upper blocks and the lower blocks.

If the upper blocks correspond to one frame and the lower blocks correspond to the next frame, that is to say in image mode, the upper blocks are stored one after another in a memory space and the lower blocks one after another in another memory space, each memory space thus corresponding to a frame.

If the upper and lower blocks correspond to one and the same frame, that is to say in frame mode, they are stored one after another, that is to say firstly the upper blocks of a row (of semi-macroblocks) then the lower blocks corresponding to the next row. The next frame is stored in another memory space.

The storage process is described for the frame mode and can be generalized without difficulty to the image mode. It is applied to each of the memory spaces, taken separately, by considering, for each of them, only the semi-macroblocks which are stored therein.

A page 4 can store, in our example, 8 semi-macroblocks MB referenced 3. The storage of the next 8 semi-macroblocks MB is performed in the next page 5 and so on and so forth. There is therefore, every 8 semi-macroblocks, a page change or skip 7 referred to as a "page miss" in the technical literature. Semi-macroblock No. 45, which corresponds to the end of the first row, is stored in the middle of a page referenced 6, more exactly as $5^{th}$ semi-macroblock out of the 8 semi-macroblocks of the page.

The next semi-macroblock, which corresponds to the semi-macroblock at the start of the second row of the frame, is stored at the start of a new page 8 in the memory, the start-of-page storage of a start-of-row semi-macroblock being the simplest solution for handling the addresses.

FIG. 3 shows the drawbacks of such a prior art. The memory space is represented schematically as a function of the size of the semi-macroblocks 13 stored. The emboldened lines 12 correspond to the boundaries of pages, pages of dimension 8 blocks of 16×8 pixels. Three overlaid complete pages are represented corresponding to groups of overlaid semi-macroblocks of three successive rows in the frame. Requiring to access image blocks of greater dimension than that of the semi-macroblocks stored, it is necessary to access several pages so as to read an image block. Thus, access to the block of 17 lines×9 pixels, referenced 9, requires 4 page changes, access to block 10 of the same dimension, 2 page changes and access to block 11 of dimension 24 lines×12 pixels, 6 page changes. This calculation takes Into account the first page change that has to be performed, to access the block.

In this configuration, the maximum number of page changes for a block of dimension 17×9 is 4, the maximum number of page changes for a block of dimension 24×12 is 6.

The memory write/read device must be configured in such a way as to take account of the maximum possible number of page changes. Thus, the greater this number, the greater the access times, even for access to a single page.

These page changes or more exactly the maximum possible number of page changes requires a configuration of the system which penalizes access time to the data stored and which therefore reduces the passband of the memory bus, which passband corresponds to the number of pixels which can be accessed in a given duration. A page change requires a certain number of clock cycles, thereby decreasing the access time.

The purpose of the invention is to alleviate the aforesaid drawbacks.

SUMMARY OF THE INVENTION

To this end, the subject of the invention is a process for storing digital video data of an image, the image being chopped into image blocks (h, v) consisting of v lines of h pixels, the set of blocks over an image width constituting a row, the data being stored as successive image blocks in an order corresponding to a television type scanning, in successive pages of a dynamic random access memory, for the reading of image blocks (H, V) consisting of V lines of H pixels, characterized in that the horizontal shift $D_{I, I+a}$, in terms of number of blocks (h, v), of the boundary of a page corresponding to any row I of the image with respect to the boundary of a page corresponding to a row I+a is equal to:

$D_{I, I+a}$=a D, ∀ positive integer a less than $R_M$=INT [(V−2)/v]+2, (INT corresponding to the integer part of the division)

the value D, which corresponds to the shift between two successive rows being chosen such that:

$D \geq (B_M-1)$, with $B_M$=INT [(H−2)/h]+2.

According to a particular mode of implementation, the process is characterized in that the shift is obtained by leaving memory spaces corresponding to one or more blocks (h, v) blank in the page storing the last blocks of a row.

The invention also relates to a process for estimating motion storing blocks (h, v) of dimensions h, v so as to obtain a reconstructed image in a memory and carrying out a comparison of a block of a current image with blocks (H, V) of dimension H, V of the stored reconstructed image, characterized in that the blocks (h, v) are stored in the pages of a memory of SDRAM type according to one of the processes described above.

The invention also relates to a correlation process performing a storage of image blocks (h, v) of dimensions h, v so as to obtain a reconstructed image in a memory, a reading of a search window (H, V) of the reconstructed image of dimension H, V so as to carry out a correlation of a block of a current image with an image block lying in the search window, characterized in that the blocks (h, v) are stored in the pages of a memory of SDRAM type according to one of the processes described above.

The invention also relates to a process for predicting an image block in a reconstructed image performing a storage of image blocks (h, v) of dimension h, v so as to obtain a reconstructed image, a prediction on the basis of a motion vector so as to define a block of dimension (H, V) in the reconstructed image, a reading of this block (H, V), characterized in that the blocks (h, v) are stored in the pages of a memory of SDRAM type according to one of the processes described above.

By virtue of the invention, the maximum number of page changes is limited and consequently the passband is improved. The access time to a block of pixels is optimized. The minimizing of the time of use of the memory bus, owing to the reduction in the overall transfer time, is particularly advantageous, the passband being an important limitation in the performance of the memory access devices nowadays employed.

BRIEF DESCRIPTION OF THE DRAWINGS

The characteristics and advantages of the present invention will be better apparent from the following description given by way of example and with reference to the appended figures where.

DETAILED DESCRIPTION OF THE PREFERRED EMBODIMENTS

Figure 4:
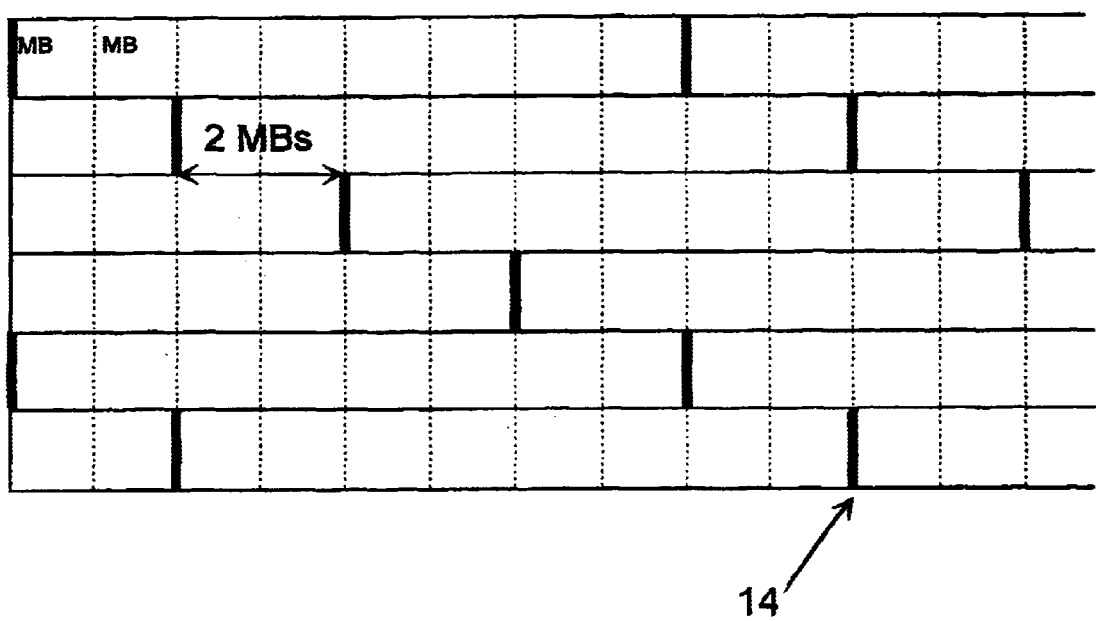
FIG. 4 represents a configuration of the memory space according to the invention.

The dimension of the pages is, enlisting the example given earlier, 8 semi-macroblocks of 16×8 pixels. From one row of semi-macroblocks to the row beneath, as shown in FIG. 4, the vertical boundaries 14 of the pages, which boundaries are represented by emboldened lines and correspond to page skips, are shifted by a space equal to 2 semi-macroblocks (or to 2 macroblocks since the width is the same). Thus, the semi-macroblocks of a frame lying beneath the first and second semi-macroblock of a page belong to another page.

Figure 3:
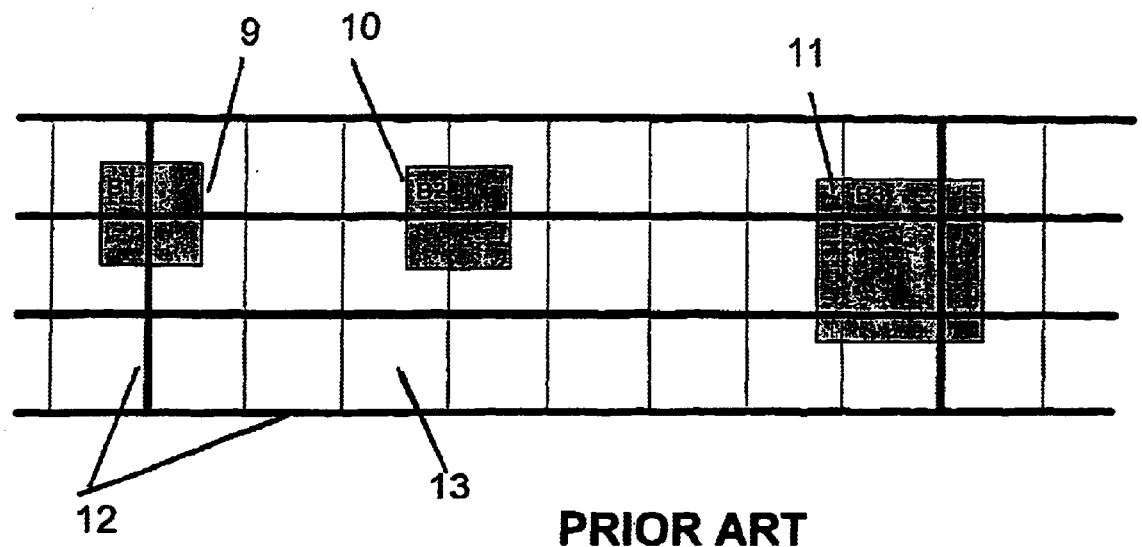
FIG. 3 represents blocks to be read from a memory configured according to the prior art.
Figure 5:
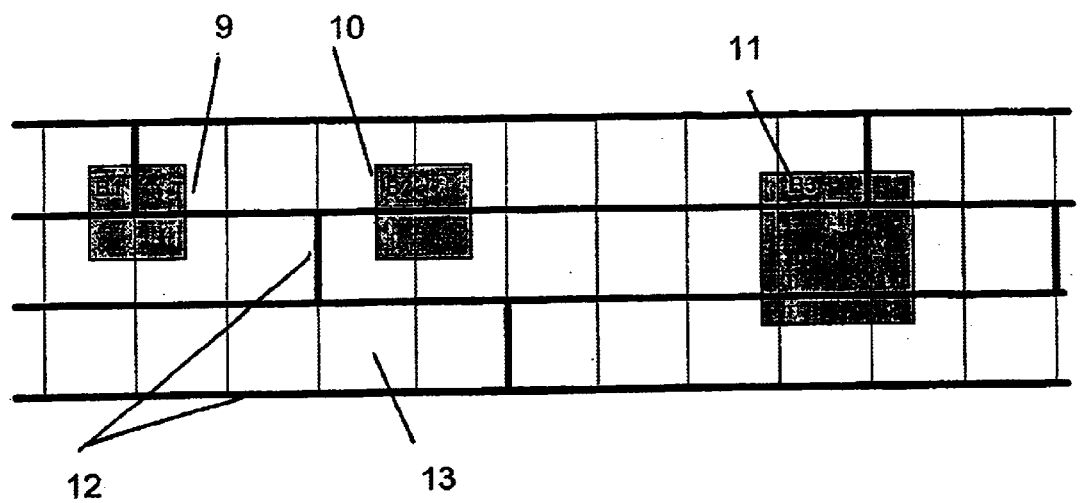
FIG. 5 represents blocks to be read from a memory configured according to the invention.

FIG. 5 is to be compared with FIG. 3 where semi-macroblocks 13 are stored and represents the same image blocks 9, 10, 11 in the memory. By virtue of the shifting of the boundaries of the pages, access to the block of 17 lines×9 pixels, referenced 9, requires 3 page changes instead of 4, access to block 10 of like dimension, 2 page changes and access to block 11 of dimension 24 lines×12 pixels, 4 page changes instead of 6.

In this configuration, the maximum number of page changes for a block of dimension 17×9 is 3, the maximum number of page changes for a block of dimension 24×12 is 4. Thus, by virtue of this configuration, the number of page changes can be decreased by two, i.e. a gain of 12 memory clock cycles in our application.

The shift effected is in fact dependent on the dimensions of the image blocks to be read, relative to those of the stored blocks.

The stored blocks are of dimension h, v, that is to say consist of v lines of h pixels and are called blocks (h, v).

The blocks to be read are blocks of dimension H, V, that is to say consist of V lines of H pixels and are called blocks (H, V).

The maximum number of rows of blocks, in the memory, over which a block (H, V) of vertical dimension V can be distributed is:

$$R_M = \text{INT}[(V-2)/v] + 2$$

INT (for INTeger) represents the integer part of the division.

The maximum number of blocks, horizontally, over which a block (H, V) of horizontal dimension H can be distributed is:

$$B_M = \text{INT}[(H-2)/h] + 2$$

The constraints to be observed with regard to the horizontal shift D (in terms of number of blocks stored) of the pages constituting the memory are, between two successive rows of blocks:

$$D \geq (B_M - 1)$$

For example, for the (H, V) block referenced 9 or 10, distributed, vertically, at most over two successive rows ($R_M = 2$) and whose dimension H is between 1 and h+1, that is to say a block distributed horizontally over 2 blocks (h, v) at most ($B_M = 2$), the shift D is taken equal to 1.

When a block (H, V) can be distributed over several rows, the constraint is generalized to the maximum number of rows $R_M$ calculated for this block:

Let D be the value of the shift chosen between two successive rows, this value satisfying the inequality:

$$D \geq (B_M - 1)$$

Let a be an integer variable which can range between 1 and $R_M - 1$, the constraint can then be written:

$$D_{I, I+a} = a\,D, \forall a, R_M > a \geq 1.$$

with $D_{I, I+a}$ the shift between any row I and a row I+a.

For example, for the block (H, V) referenced 11, distributed, vertically, over at most three successive rows ($R_M = 3$) and whose dimension H is between h+2 and 2h+1, that is to say a block distributed horizontally over 3 blocks (h, v) at most ($B_M = 3$), the shift $D_{I, I+1}$ is equal to 2 and the shift $D_{I, I+2}$ is equal to 4.

Figure 1:
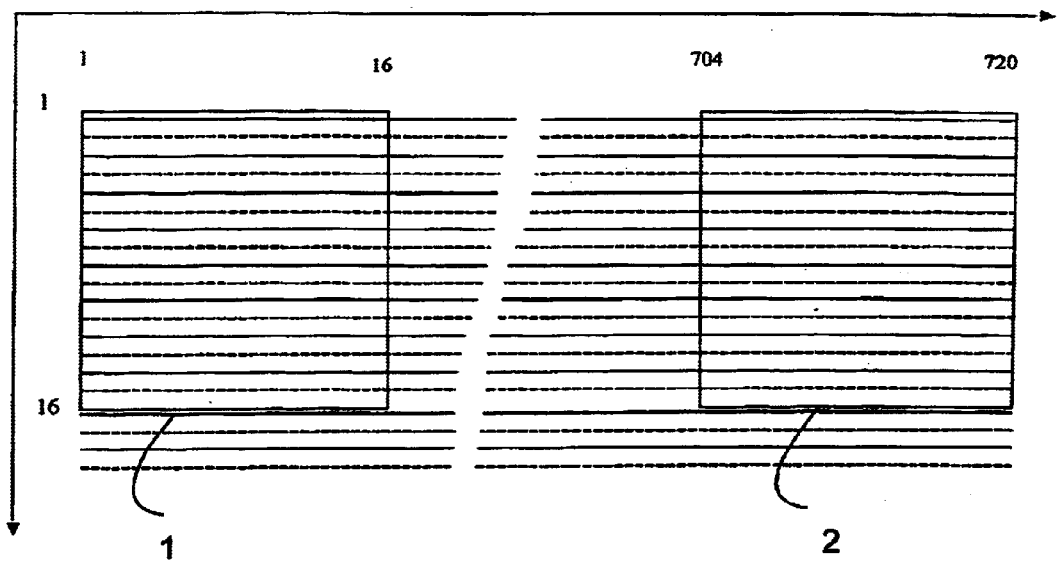
FIG. 1 represents a first and last macroblock of a slice of macroblocks of an image.
Figure 2:
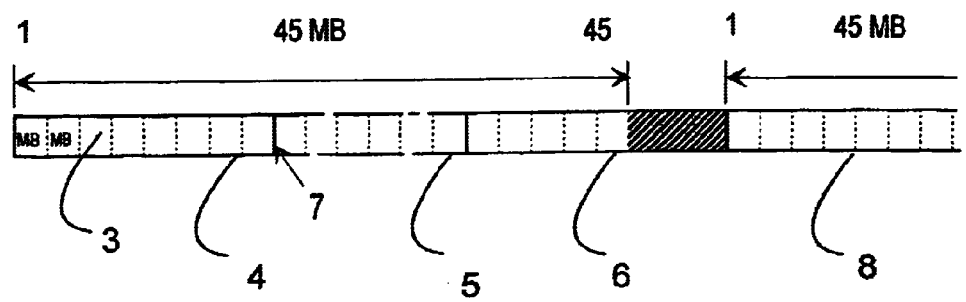
FIG. 2 represents the storage of semi-macroblocks in a memory, according to the prior art.
Figure 6:
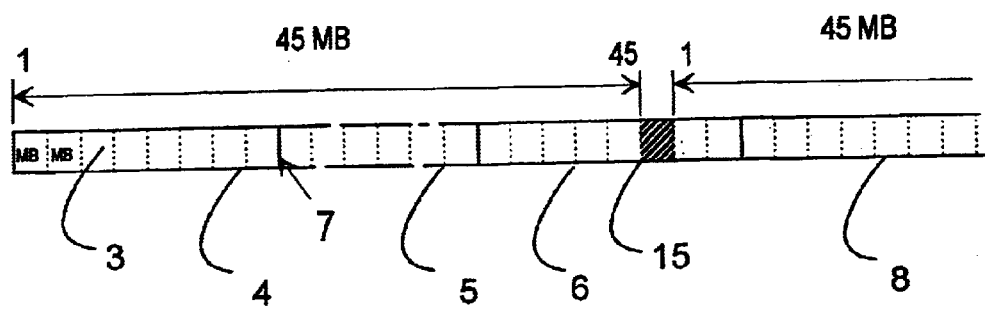
FIG. 6 represents the storage of semi-macroblocks in a memory according to the invention.

To effect such a shift, unused areas are created in the memory space. FIG. 6, which is to be compared with FIG. 2 represents, on a continuous line, a succession of memory pages 4, 5, 6, 8 such as they are addressed during the storage of the semi-macroblocks. On arriving at the last semi-macroblock of the first row, which is the fifth semi-macroblock stored in the page referenced 6, a memory area 15 of dimension corresponding to a semi-macroblock is left blank so as to record the first and second semi-macroblocks of the next row at the seventh and eighth site of semi-macroblock in the page. Thus, the next page 8 records the third semi-macroblock of this next row. The semi-macroblock lying, in the frame, above this first semi-macroblock in page 8, has, for its part, been stored as third semi-macroblock in the corresponding page 3 of the upper row.

A shift of three semi-macroblocks would correspond to no memory space left free, a shift of a single semi-macroblock would correspond to two memory spaces of semi-macroblock dimension.

In general, the number of semi-macroblocks stored in the first page of the next row, the preceding row commencing with a new page, corresponds to this shift, a number of 8 semi-macroblocks corresponding to no shift.

The description has been given on the basis of the stored semi-macroblocks. This is of course an exemplary embodiment, and the semi-macroblocks may be replaced by any type of image blocks, of any dimension, without the process departing from the field of the invention.

The storage has been described at the level of the frames of an image. It can be performed at the level of the complete image, for example emanating from sequential scanning. The chopping of the image into blocks is then carried out on the basis of the complete image and the image blocks are stored in a single memory space.

The applications of the present invention relate, for example to access to a predicted block, on the basis of a motion vector, in a reconstructed image, access to the search windows for correlation with a current block during the calculation of the motion estimate.

The stored blocks can be luminance blocks forming part of the macroblocks defined in the MPEG standard. They may also be chrominance blocks alone or luminance and chrominance blocks together.

The invention can also be applied to the storage of the blocks reconstructed in an MPEG decoder. The predicted blocks to be read from the memory and defined by the motion vectors are generally of greater dimension than the stored blocks, for example when the motion vector is accurate to within half a pixel. These read blocks are thereafter redimensioned by interpolation for the calculation of the current image block.

What is claimed is:

1. A process for storing digital video data of an image, comprising the steps of:
   the image being chopped into a plurality of image blocks (h, v), wherein:
   each block of said plurality of image blocks (h, v) consisting of v lines of h pixels; and
   a set of image blocks from said plurality of image blocks constituting a row over an image width;
   the digital video data being stored successively as the plurality of image blocks in an order corresponding to a television type scanning where the plurality of image blocks are stored in successive pages of a dynamic random access memory (DRAM) used for reading at least one image block (H, V) consisting of V lines of H pixels, wherein,
   when considering positions of the plurality of image blocks (h, v) of the image and of the successive pages containing the plurality of image blocks (h, v), an horizontal shift D corresponding to an amount of the plurality of blocks (h, v), of a boundary of a page from the successive pages that corresponds to a row I of the image in respect to a boundary of a page from the successive pages corresponding to a next row of the image, which is implemented by leaving at least one memory space unused when storing the digital video data, so that the shift (D) is equal or greater than the maximum number of blocks ($B_M$) minus 1 over which the at least one block (H, V) can be horizontally distributed.

2. A process according to claim 1, wherein the shift is obtained by leaving memory spaces corresponding to the plurality of blocks (h, v) blank in the page storing last blocks of a row from the plurality of blocks (h, v).

3. A process according to claim 1, wherein the plurality of blocks (h, v) are part of the macroblocks defined in the MPEG standard.

4. A process according to claim 1, wherein the image is an even or odd frame.

5. A process for estimating motion storing blocks (h, v) of dimensions h and v for obtaining a reconstructed image in a memory, comprising the step of:
  comparing a block of a current image with blocks (H, V) of dimensions H and V) of the stored reconstructed image, wherein the motion storing blocks (h, v) are stored in the pages of a memory of SDRAM type according to the process of claim 1.

6. A process for storing image blocks (h, v) of dimensions h and v for obtaining a reconstructed image in a memory, comprising the steps of:
  reading a search window (H, V) of the reconstructed image of dimensions H and V;
  correlating a block of a current image with an image block in the search window, wherein the image blocks (h, v) are stored in the pages of a memory of SDRAM type according to the process of claim 1.

7. A process for predicting an image block in a reconstructed image comprising the steps of:
  performing a storage of image blocks (h, v) of dimensions h and v for obtaining a reconstructed image;
  predicting on the basis of a motion vector for defining a block (H, V) of dimensions H and V in the reconstructed image; and
  reading the block (H, V), wherein the image blocks (h, v) are stored in the pages of a memory of SDRAM type according to the process of claim 1.

* * * * *